US012735067B2

(12) United States Patent
Ko

(10) Patent No.: US 12,735,067 B2
(45) Date of Patent: Sep. 15, 2026

(54) APPARATUS FOR CONTROLLING A VEHICLE AND METHOD THEREOF

(71) Applicants: Hyundai Motor Company, Seoul (KR); Kia Corporation, Seoul (KR)

(72) Inventor: Sung Yeon Ko, Hanam-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 493 days.

(21) Appl. No.: 18/104,641

(22) Filed: Feb. 1, 2023

(65) Prior Publication Data

US 2024/0051578 A1 Feb. 15, 2024

(30) Foreign Application Priority Data

Aug. 9, 2022 (KR) ........................ 10-2022-0099319

(51) Int. Cl.
*B60W 60/00* (2020.01)
*B60W 50/02* (2012.01)
*B60W 50/023* (2012.01)

(52) U.S. Cl.
CPC .. *B60W 60/00186* (2020.02); *B60W 50/0205* (2013.01); *B60W 50/023* (2013.01)

(58) Field of Classification Search
CPC .. B60W 60/00; B60W 60/001; B60W 60/005; B60W 60/0015; B60W 60/0016; B60W 60/0018; B60W 60/0053; B60W 60/00186; B60W 50/00; B60W 50/02; B60W 50/029; B60W 50/0205; B60W 50/023; B60W 50/0098; B60W 50/0225; B60W 50/035; B60W 50/04; B60W 50/08; B60W 50/14; B60W 2050/0001; B60W 2050/0002; B60W 2050/0003; B60W 2050/0004; B60W 2050/0005; B60W 2050/021; B60W 2050/0215; B60W 2050/022; B60W 2050/0006;
(Continued)

(56) References Cited

U.S. PATENT DOCUMENTS 8,849,494 B1 9/2014 Herbach et al.
8,996,224 B1 3/2015 Herbach et al.
(Continued)

FOREIGN PATENT DOCUMENTS

CN 112389461 A 2/2021
DE 102019115043 B4 7/2025
(Continued)

*Primary Examiner* — Khoi H Tran
*Assistant Examiner* — Sarah A Tran
(74) *Attorney, Agent, or Firm* — MORGAN, LEWIS & BOCKIUS LLP

(57) ABSTRACT

A vehicle control apparatus and a method thereof include a first controller configured to perform control for safety of a vehicle; a second controller configured to mainly perform determination and control of autonomous driving of the vehicle; and a third controller configured to subordinately perform the determination and the control of the autonomous driving of the vehicle, wherein the third controller is configured to determine whether the second controller fails, when the second controller fails, to change a control subject for performing an autonomous driving function from the second controller to the third controller, and to transmit control subject change information to the first controller.

18 Claims, 5 Drawing Sheets

(58) Field of Classification Search
CPC . B60W 2050/0292; B60W 2050/0297; B60W 2050/041; B60W 2050/143; B60Y 2306/00; B60Y 2306/13; B60Y 2306/15
USPC .......................................................... 701/23
See application file for complete search history.

(56) References Cited

U.S. PATENT DOCUMENTS 9,008,890 B1 4/2015 Herbach et al.
9,043,056 B2 5/2015 Nemeth
9,079,587 B1 7/2015 Rupp
9,081,382 B2 7/2015 Doyle et al.
9,096,199 B2 8/2015 Yopp
10,611,381 B2 4/2020 Khalifeh et al.
11,327,486 B2 5/2022 Park et al.
11,338,827 B2 5/2022 Ju et al.
2003/0112746 A1 6/2003 Schaller et al.
2018/0370540 A1 12/2018 Yousuf
2019/0020985 A1 1/2019 Dai et al.
2020/0192357 A1 6/2020 Park et al.
2021/0046952 A1 2/2021 Ju et al.
2021/0163021 A1 6/2021 Frazzoli et al.
2021/0387643 A1* 12/2021 Hari .................... B60W 30/095
2023/0339480 A1* 10/2023 Yen .................. B60W 50/0225
2024/0010185 A1 1/2024 Yasuda
2024/0051554 A1 2/2024 Ko et al.
2024/0166219 A1 5/2024 Lim et al.
2024/0300502 A1 9/2024 Lee et al.
2025/0065919 A1* 2/2025 Yu ..................... B60W 50/0097

FOREIGN PATENT DOCUMENTS

JP 6401541 B 10/2018
JP 2021-031051 A 3/2021
KR 10-2020-0081523 A 7/2020
KR 10-2020-0143309 A 12/2020
KR 10-2021-0006926 A 1/2021
KR 10-2024-0020953 A 2/2024

* cited by examiner

APPARATUS FOR CONTROLLING A VEHICLE AND METHOD THEREOF

CROSS-REFERENCE TO RELATED APPLICATION

The present application claims priority to Korean Patent Application No. 10-2022-0099319, filed on Aug. 9, 2022, the entire contents of which are incorporated herein for all purposes by this reference.

BACKGROUND OF THE PRESENT DISCLOSURE

Field of the Present Disclosure

The present disclosure relates to a vehicle control apparatus and method, and more particularly, to a failure response technique of an autonomous vehicle when a main controller fails during autonomous driving.

Description of Related Art

An autonomous vehicle requires the ability to adaptively respond to changing surroundings in real time while driving. To mass-produce and activate autonomous vehicles, a reliable determination control function is required above all else. A recently released semi-autonomous vehicle basically performs driving, braking, and steering on behalf of a driver, reducing driver fatigue. In the case of semi-autonomous driving, unlike fully autonomous driving, a driver may keep his or her concentration on driving, such as holding a steering wheel continuously. Recently, semi-autonomous vehicles are being sold while provided with an highway driving assist (HDA) function, a driver status warning (DSW) function that outputs a warning alarm through a cluster, etc. by determining driver negligence and status abnormalities such as drowsiness and eye deviation, a driver awareness warning (DAW) function that checks whether the vehicle is driving unsafely, such as deviating from a lane through a front camera, a forward collision-avoidance assist (FCA) or an active emergency brake (AEBS) function that performs sudden braking when forward collision is detected.

However, in a conventional autonomous driving system, a response strategy is not established when a failure of the main controller occurs during autonomous driving, so that autonomous driving may be stopped. Accordingly, it is necessary to develop a technique to cope with the failure of the main controller for autonomous driving.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle control apparatus and method, configured for performing a failure response when a main controller of an autonomous vehicle fails.

The technical objects of the present disclosure are not limited to the objects mentioned above, and other technical objects not mentioned may be clearly understood by those skilled in the art from the description of the claims.

Various aspects of the present disclosure are directed to providing a vehicle control apparatus, including: a first controller configured to perform control for safety of a vehicle; a second controller configured to mainly perform determination and control of autonomous driving of the vehicle; and a third controller configured to subordinately perform the determination and the control of the autonomous driving of the vehicle, wherein the third controller is further configured to determine whether the second controller fails, when the second controller fails, to change a control subject for performing an autonomous driving function from the second controller to the third controller, and to transmit control subject change information to the first controller.

In an exemplary embodiment of the present disclosure, the first controller is configured to receive the control subject change information from the third controller, and then to perform a failure response strategy based on a vehicle control command received from the third controller.

In an exemplary embodiment of the present disclosure the third controller may be configured to have a risk level which is higher than or equal to a risk level of the second controller.

In an exemplary embodiment of the present disclosure, the failure response strategy may include a transition demand requesting transfer of control authority from a system to a driver, a minimum risk maneuver (MRM), or at least one of any combination thereof.

In an exemplary embodiment of the present disclosure, the first controller may be configured to determine whether the second controller or the third controller fails during the autonomous driving, and to perform the autonomous driving function based on whether the second controller or the third controller fails instead of the second controller or the third controller.

In an exemplary embodiment of the present disclosure, the first controller, when the second controller and the third controller fail, may be configured to perform a failure response strategy by itself.

In an exemplary embodiment of the present disclosure, the vehicle control command may include at least one of a longitudinal control command, a lateral control command, or any combination thereof.

In an exemplary embodiment of the present disclosure, the second controller may be configured to transmit failure state information to the first controller or the third controller by determining its own failure state.

In an exemplary embodiment of the present disclosure, the third controller, may be configured to transmit failure state information to the first controller by determining its own failure state.

In an exemplary embodiment of the present disclosure, the first controller may be configured to determine a failure state of the second controller or the third controller based on failure state information received from the second controller or the third controller, and the third controller is further configured to determine a failure state of the second controller based on failure state information received from the second controller.

In an exemplary embodiment of the present disclosure, the first controller may be configured to determine a failure state of the second controller or the third controller by determining disconnection of communication with the second controller or the third controller based on wired network communication with the second controller or the third controller, and the third controller may be configured to determine a failure state of the second controller by determining disconnection of communication with the second controller based on wired network communication with the second controller.

In an exemplary embodiment of the present disclosure the first controller may be a chassis controller, the second controller may be a main controller, and the third controller may be a sub controller.

In an exemplary embodiment of the present disclosure the second controller may include an electronic control unit (ECU), and the third controller may include a front camera.

Various aspects of the present disclosure are directed to providing a vehicle control method, including: determining, by a first controller that performs control for safety of a vehicle, whether a second controller that mainly performs determination and control of autonomous driving of the vehicle and a third controller that subordinately performs the determination and the control of the autonomous driving of the vehicle fail; and performing, by the first controller, an autonomous driving function of the vehicle based on whether the second controller or the third controller fails instead of the second controller or the third controller.

In an exemplary embodiment of the present disclosure, it may further include receiving, by the first controller, the control subject change information from the third controller, and then performing a failure response strategy based on a vehicle control command received from the third controller.

In an exemplary embodiment of the present disclosure the third controller may be configured to have a risk level which is higher than or equal to a risk level of the second controller.

In an exemplary embodiment of the present disclosure, the failure response strategy may include a transition demand requesting transfer of control authority from a system to a driver, a minimum risk maneuver (MRM), or at least one of any combination thereof.

In an exemplary embodiment of the present disclosure, it may further include: determining, by the first controller, whether the second controller or the third controller fails during the autonomous driving; and performing, by the first controller, an autonomous driving function based on whether the second controller or the third controller fails instead of the second controller or the third controller.

In an exemplary embodiment of the present disclosure, it may further include: performing, by the first controller, the failure response strategy based on a command of the third controller when the second controller fails; and performing, by the first controller, the failure response strategy by itself when the second controller and the third controller fail.

In an exemplary embodiment of the present disclosure, the determining of whether it fails may include: determining, by the second controller, its own failure state and transmitting failure state information to the first controller or the third controller; determining, by the first controller, a failure state of the second controller or the third controller based on failure state information received from the second controller or the third controller; and determining, by the second controller, a failure state of the second controller based on failure state information received from the second controller.

According to the present technique, it is possible to improve safety and convenience of an autonomous driving system by performing a failure response even when a main controller of an autonomous vehicle fails.

Furthermore, various effects which may be directly or indirectly identified through the present specification may be provided.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
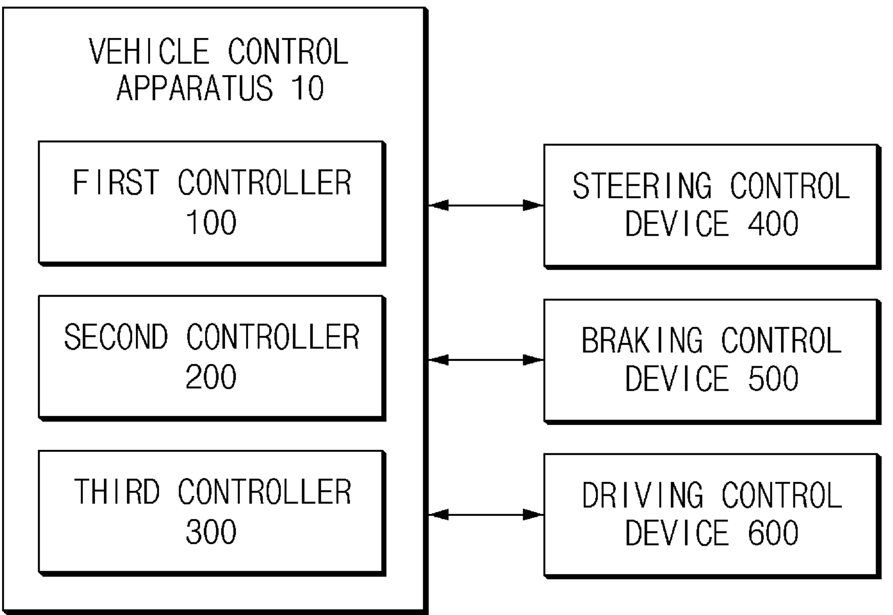
FIG. 1 illustrates a block diagram showing a configuration of a vehicle system including a vehicle control apparatus according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to various exemplary embodiments of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field of the present disclosure to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 1 to FIG. 5.

Figure 2:
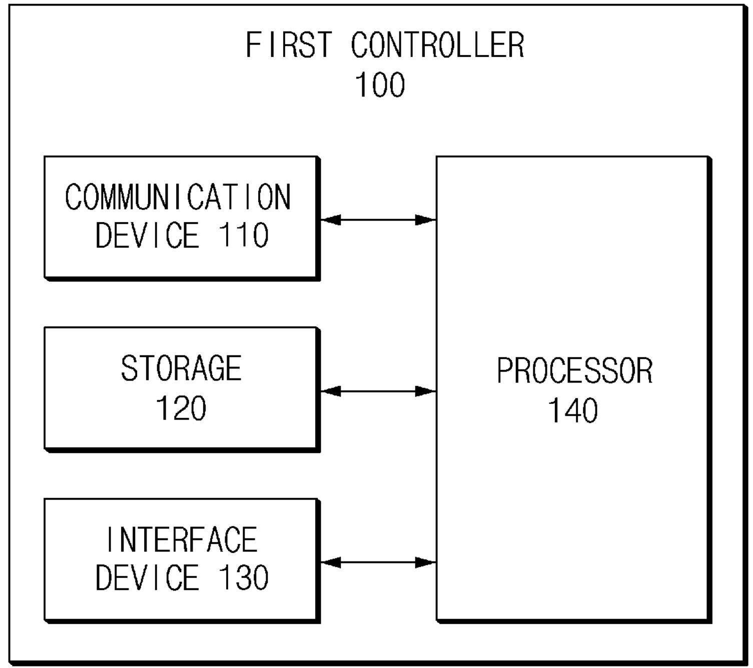
FIG. 2 illustrates a detailed configuration of a first controller according to an exemplary embodiment of the present disclosure.

FIG. 1 illustrates a block diagram showing a configuration of a vehicle system including a vehicle control apparatus according to various exemplary embodiments of the present disclosure, and FIG. 2 illustrates a detailed configuration of a first controller according to an exemplary embodiment of the present disclosure.

The vehicle system of the present disclosure may include a system of an autonomous vehicle. According to the international association of vehicle engineers (SAE), an automatic driving system (ADS) and an advanced driver assistance system (ADAS) may be classified based on Levels 0 to 5, and an ADS, which requires no driver assistance, may be classified based on a system of Level 3 or higher. It is noted that, in a system of Level 3, a fallback-ready user FRU must respond in an emergency situation, and in a system of Level 4 or higher, an autonomous vehicle should be able to respond (fallback) by itself even in the event of an emergency such as a breakdown. Herein, the response of the autonomous vehicle indicates performing a control (minimum risk maneuver (MRM)) to change to a minimum risk condition (MRC) or TD in the event of a failure. Currently, the autonomous driving system including Level 2 may immediately release the autonomous driving mode when a system failure situation occurs, and the autonomous driving system including Level 3 may output transition demand (TD) requesting take-over of control authority from the system to a driver in the event of a system failure, and then may induce a safe stop by switching to a minimum risk maneuver (MRM) mode.

Referring to FIG. 1, the vehicle system according to the exemplary embodiment of the present disclosure may include a vehicle control apparatus 10, a steering control device 400, a braking control device 500, and an driving control device 600. In the instant case, the steering control device 400, the braking control device 500, and the driving control device 600 may be controlled and driven by the vehicle control apparatus 10.

The vehicle control apparatus 10 according to the exemplary embodiment of the present disclosure may be implemented inside the vehicle. In the instant case, the vehicle control apparatus 10 may be integrally formed with internal control units of the vehicle, or may be implemented as a separate device to be connected to control units of the vehicle by a separate connection means.

The vehicle control device 10 includes a first controller 100 that performs control for safety of the vehicle, a second controller 200 that mainly performs determination and control of autonomous driving, and a third controller 200 that subordinately performs determination and control of autonomous driving.

The first controller 100 may determine whether the second controller 200 or the third controller 300 fails during autonomous driving to perform an autonomous driving function of the vehicle based on whether the second controller 200 or the third controller 300 is faulty instead of the second controller 200 or the third controller 300.

The first controller 100 is related to a safety device of the vehicle, and maintains driving stability by controlling turning stability of the vehicle in response to road changes and controlling maneuverability. The first controller 100 may be a chassis controller. In the instant case, the chassis controller refers to a controller for a prime mover, a power transmission device, a brake device, a driving device, a suspension device, and a steering device, which are components of a chassis, and in the present disclosure, it may refer to a controller for a braking device and a steering device that require cooperative control to perform autonomous driving. In the instant case, the chassis is a vehicle frame that forms a basis of a vehicle, and refers to a state in which a vehicle body is not mounted, indicates the prime mover, the power transmission device, the brake device, the driving device, the suspension device, steering device, etc., and since minimum mechanical devices necessary for the vehicle to travel are provided, the chassis itself may be driven.

That is, the first controller 100 integrates and is configured to control an electronic control suspension (ECS) that performs front and rear damper control for a tendency of oversteer or understeer, or an electronic stability control that performs torque vectoring control.

The first controller 100 may include various types of control devices related to vehicle safety, such as a motor driven power steering which assists steering torque, an electronic stability control (ESC) which is configured to control occurrence of understeer and oversteer in a sudden situation such as a sharp curve or an obstacle, an anti-lock brake system (ABS) which shortens a braking distance during sudden braking or driving on icy roads, an autonomous emergency brake (AEB), a tire pressure monitoring system (TPMS) which is an automatic tire pressure monitoring system, an electronic stability program (ESP) for preventing a vehicle from deviating when a driver can't balance the vehicle when a dangerous or severe situation comes while the driver is driving, a vehicle dynamic control (VDC), a traction control system (TCS) for preventing idle wheels, 4 wheel drive, etc.

The second controller 200, which is a main controller, may mainly perform determination and control of the autonomous driving function, and may perform overall control so that each component can perform its functions normally. The second controller 200 may be implemented in a form of hardware, software, or a combination of hardware and software. For example, the second controller 200 may be implemented as a microprocessor, but the present disclosure is not limited thereto.

The second controller 200 may include an electronic control unit (ECU) mounted in a vehicle, an engine management system (EMS), a transmission control unit (TCU) for controlling an automatic transmission, and the like.

When a dangerous situation occurs, the second controller 200 may perform transition demand (TD) requesting transition of control authority from the system to the driver and a minimum risk maneuver (MRM). That is, when a dangerous situation occurs, the second controller 200 output an alarm to request the driver to take over the control authority for driving, and may perform an MRM operation of the vehicle when the take-over of the control authority is not completed within a predetermined time period. That is, the second controller 200 may stop the vehicle by decelerating it to a predetermined speed during the MRM operation of the vehicle.

The third controller 300, which is a sub controller, may include a front camera and the like.

The third controller 300 may have a redundancy function for performing an autonomous driving function instead of the second controller 200 when the second controller 200 fails. For example, the third controller 300 may perform an autonomous control function corresponding to Level 2 of the autonomous driving function.

The third controller 300 may monitors a failure of the second controller 200 during autonomous driving, when the failure of the second controller 200 occurs, may change a control subject from the second controller 200 to the third controller 300, may transmit the change of the control subject to the first controller 100, and may transmit a control command to the first controller 100.

When the second controller 200 fails, when the control subject is changed from the second controller 200 to the third controller 300, the first controller 100 may receive a control command for fault response from the third controller 300, and when the control subject is changed from the second controller 200 to the first controller 100, may perform a failure response strategy response such as the TD and the MRM by itself.

Furthermore, when the second controller 200 fails, the third controller 300 may output a control command (e.g., a lateral control command or a longitudinal control command) for performing failure response such as the TD and the MRM to the first controller 100 instead of the second controller 200. Accordingly, the first controller 100 may not follow the control command of the second controller 200, and may instead perform the control command of the third controller 300.

Furthermore, the third controller 300 may guarantee a level of risk (e.g., an ASIL) equal to or greater than that of the second controller 200. That is, the automotive safety integrity level (ASIL) represents an automotive safety integrity level. ASIL A represents a lowest level and ASIL D represents a highest level of vehicle risk.

Accordingly, the third controller 300 may perform determination and control commands equivalent to those of the second controller 200 by ensuring a level of risk level equal to or greater than that of the second controller 200, and may maintain autonomous driving as much as possible when the second controller 200 fails. Accordingly, the third controller 300 may monitor the failure of the second controller 200.

When the control subject is changed from the second controller 200 to the third controller 300 due to the failure of the second controller 200, the first controller 100 may receive the control command from the second controller 200 to perform the failure response strategy.

When the second controller 200 fails, the first controller 100 may perform the MRM based on the command of the third controller 300. Furthermore, when the second controller 200 and the third controller 300 fail, the first controller 100 performs the MRM without commands from the second controller 200 and the third controller 300.

The second controller 200 may determine its own failure state to transmit its own failure state information to the third controller 300.

The second controller 200 and the third controller 300 may determine their own failure state to transmit failure state information to the first controller 100.

Accordingly, the first controller 100 may determine the failure state of the second controller 200 or the third controller 300 based on the failure state information received from the second controller 200 or the third controller 300.

Furthermore, the first controller 100 may determine the failure state of the second controller 200 or the third controller 300 by determining disconnection of communication with the second controller 200 or the third controller 300 based on wired network communication (e.g., CAN communication) with the second controller 200 or the third controller 300.

Furthermore, the third controller 200 may determine the failure state of the second controller 200 by determining disconnection of communication with the second controller 200 based on the CAN communication with the second controller 200.

Referring to FIG. 2, the first controller 100 may include a communication device 110, a storage 120, an interface device 130, and a processor 140.

The communication device 110 is a hardware device implemented with various electronic circuits to transmit and receive signals through a wireless or wired connection, and may transmit and receive information based on in-vehicle controllers and in-vehicle network communication techniques. As an exemplary embodiment of the present disclosure, the in-vehicle network communication techniques may include controller area network (CAN) communication, Local Interconnect Network (LIN) communication, flex-ray communication, and the like.

As an exemplary embodiment of the present disclosure, the communication device 110 may communicate with the second controller 200 and the third controller 300 to transmit or receive failure state information of each controller.

The storage 120 may store data and/or algorithms required for the processor 140 to operate, and the like.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input means for receiving a control command from a user and an output means for outputting an operation state of the apparatus 10 and results thereof. Herein, the input means may include a key button, and may include a mouse, a joystick, a jog shuttle, a stylus pen, and the like. Furthermore, the input means may include a soft key implemented on the display.

For example, the interface device 130 may display a driving condition of the vehicle. For example, the interface device 130 may output a screen or a voice for transferring control authority before entering the MRM.

The interface device 130 may be implemented as a head-up display (HUD), a cluster, an audio video navigation (AVN), or a human machine interface (HM), a human machine interface (HMI).

The output device may include a display, and may also include a voice output means such as a speaker. In the instant case, when a touch sensor formed of a touch film, a touch sheet, or a touch pad is provided on the display, the display may operate as a touch screen, and may be implemented in a form in which an input device and an output device are integrated. In the present disclosure, the output device may output platooning information such as sensor failure information, lead vehicle information, group rank information, a platooning speed, a destination, a waypoint, a path, and the like.

In the instant case, the display may include at least one of a liquid crystal display (LCD), a thin film transistor liquid crystal display (TFT LCD), an organic light emitting diode display (OLED display), a flexible display, a field emission display (FED), a 3D display, or any combination thereof.

The processor 140 may be electrically connected to the communication device 110, the storage 120, the interface device 130, and the like, may electrically control each component, and may be an electrical circuit that executes software commands, performing various data processing and determinations described below.

The processor 140 may process signals transferred between constituent elements of the vehicle control apparatus 10. The processor 140 may be, e.g., an electronic control unit (ECU), a micro controller unit (MCU), or other sub controllers mounted in the vehicle.

The processor 140 may perform control for vehicle safety.

The processor 140 may determine whether the second controller 200 or the third controller 300 fails during autonomous driving to perform an autonomous driving function of the vehicle based on whether the second controller 200 or the third controller 300 fails instead of the second controller 200 or the third controller 300.

When the second controller 200 fails, the processor 140 may perform the MRM based on the command of the third controller 300.

Furthermore, when the second controller 200 and the third controller 300 fail, the processor 140 may perform the MRM without commands from the second controller 200 and the third controller 300. In the instant case, a control command of the vehicle may include at least one of a longitudinal control command, a lateral control command, a deceleration control command, or any combination thereof.

The processor 140 may determine the failure state of the second controller 200 or the third controller 300 based on the failure state information received from the second controller 200 or the third controller 300.

The first controller 140 may determine the failure state of the second controller 200 or the third controller 300 by determining disconnection of communication with the second controller 200 or the third controller 300 based on a CAN communication with the second controller 200 or the third controller 300.

The steering control device 400 may be configured to control a steering angle of a vehicle, and may include a steering wheel, an actuator interlocked with the steering wheel, and a controller configured for controlling the actuator.

The braking control device 500 may be configured to control braking of the vehicle, and may include a controller that is configured to control a brake thereof.

An driving control device 600 may be configured to control engine driving of a vehicle, and may include a controller that is configured to control a speed of the vehicle.

Figure 3:
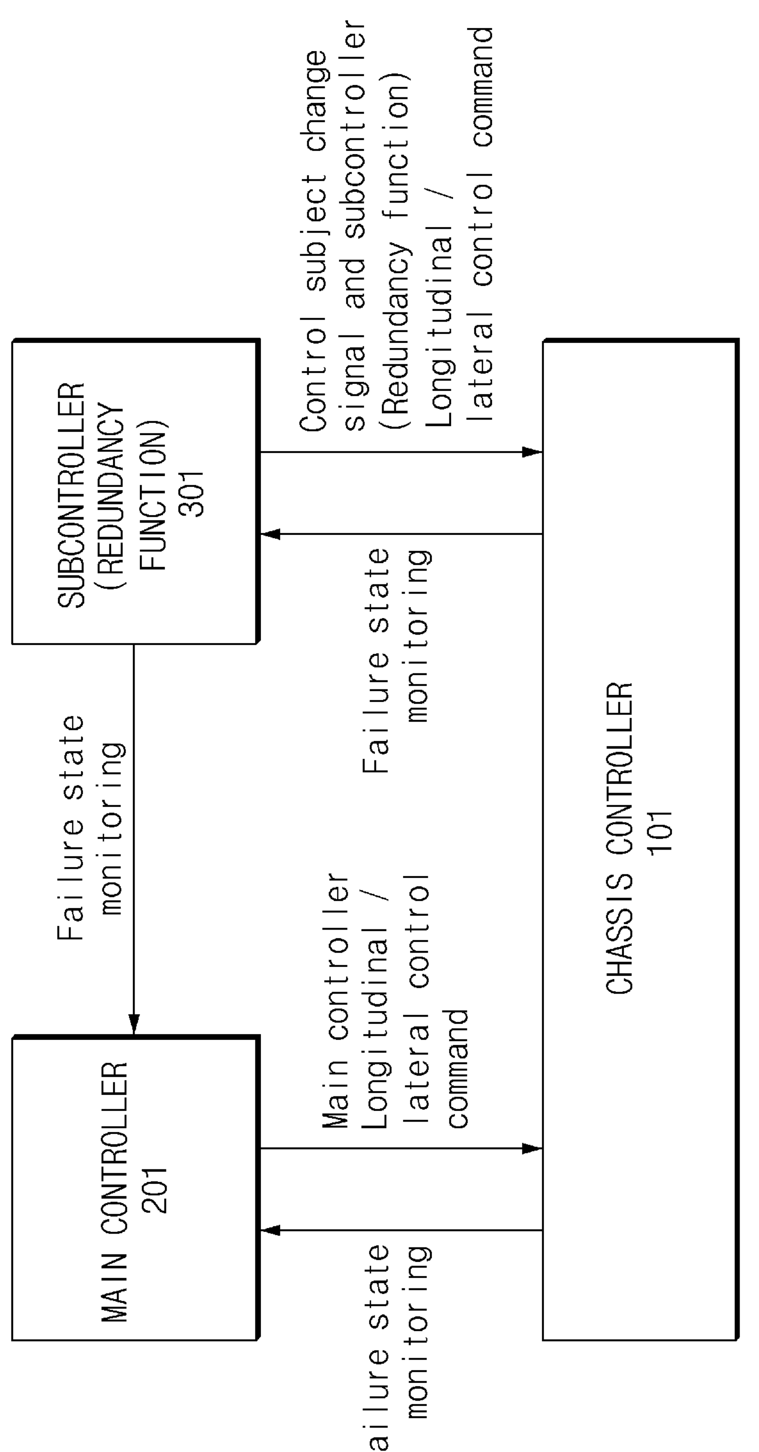
FIG. 3 illustrates a signal flow between controllers of a vehicle control apparatus according to an exemplary embodiment of the present disclosure.

FIG. 3 illustrates a signal flow between controllers of a vehicle control apparatus according to an exemplary embodiment of the present disclosure.

FIG. 3 includes a chassis controller 101 as an example of the first controller 100, a main controller 201 as an example of the second controller 200, and a subcontroller 301 as an example of the third controller 300.

The chassis controller 101 monitors failure states of the main controller 201 and the sub controller 301.

Furthermore, the chassis controller 101 may receive a longitudinal control command and a lateral control command of the vehicle from the main controller 201 and the sub controller 301 for transition demand requesting transfer of control from a system to a driver and MRM.

The main controller 201 may determine whether or not its own failure has occurred to transmit failure state information of the main controller 201 to the chassis controller 101 or the subcontroller 301. Furthermore, the subcontroller 301 may determine whether its own failure has occurred to transmit failure state information of the main controller 201 to the chassis controller 101. In the instant case, the sub controller 301 has a redundancy function, and when the main controller 201 fails, may perform an autonomous driving function instead of the main controller 201.

That is, when the main controller 201 fails, the chassis controller 101 may perform a failure response strategy (e.g., the TD, the MRM) based on a command of the subcontroller 301 instead of the main controller 201. For example, the chassis controller 101 may control a vehicle to brake at $-1$ $m/s^2$ and then stop.

The sub controller 301 may have a risk level equal to or greater than that of the main controller 201, may monitor the failure state of the main controller 201 to determine whether the main controller 201 fails, when the main controller 201 fails, may change a control subject from the main controller 201 to the subcontroller 301, and may transmit control subject change information to the chassis controller 101.

Furthermore, when the main controller 201 and the subcontroller 301 fail at a same time, the chassis controller 101 may perform a failure response strategy. For example, the chassis controller 101 may output a control authority transfer notification to a driver, and when the driver does not receive the transfer of the control authority, may control the vehicle to brake at $-4$ $m/s^2$ and then stop.

Accordingly, an ASIL of the sub controller 301 is higher than or equal to an ASIL of the main controller 201, and thus the subcontroller 301 may monitor a failure of the main controller 201, and may rapidly respond to the failure of the main controller 201 to increase safety of the autonomous vehicle.

Furthermore, when the main controller 201 fails, the subcontroller 301 may change the control subject from the main controller 201 to the sub controller 301, may notify the chassis controller 101 that the control subject has been changed, and may transmit a control command for executing the failure response strategy to the chassis controller 101 to perform the failure response strategy.

Figure 4:
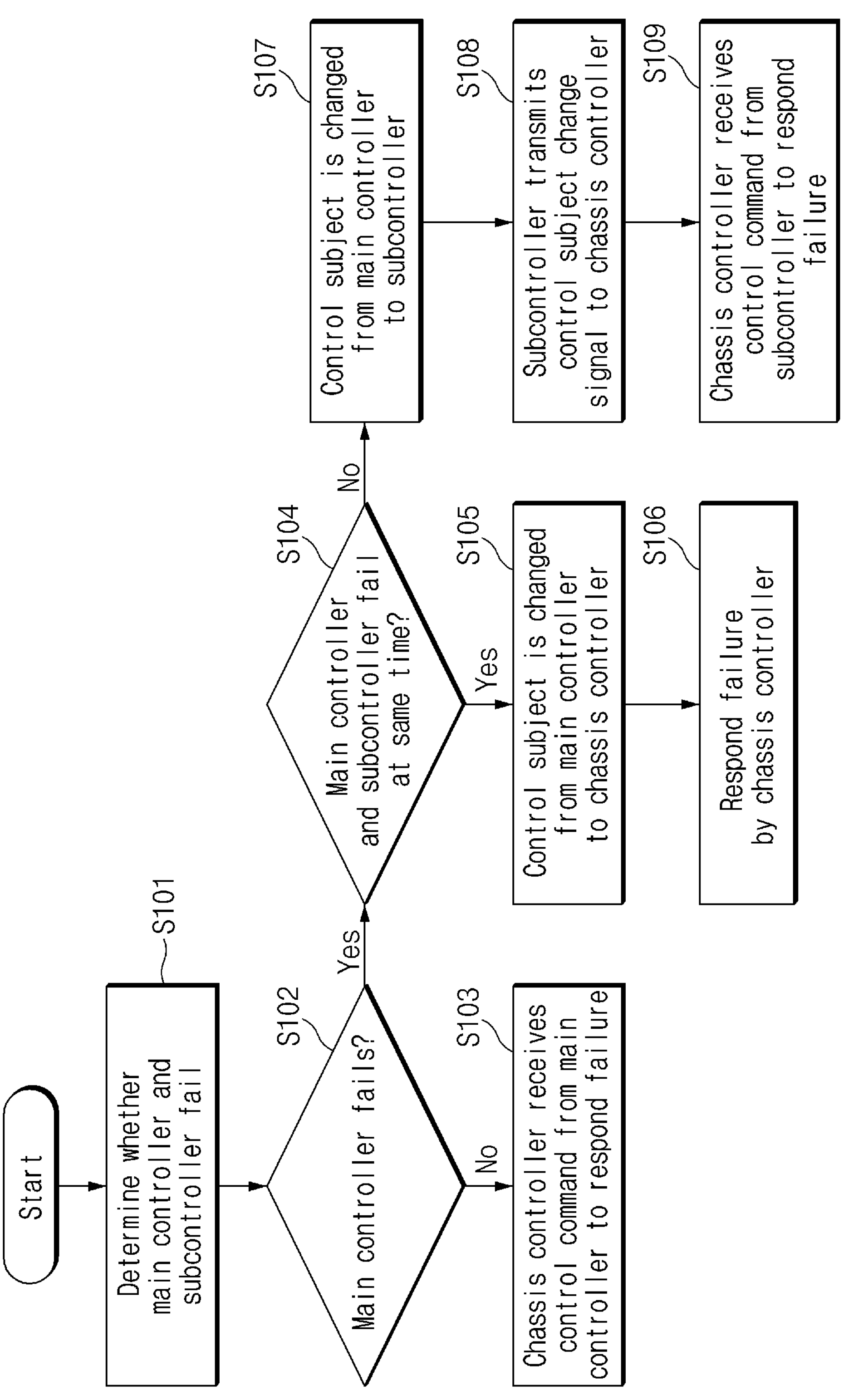
FIG. 4 illustrates a flowchart showing a vehicle control method according to an exemplary embodiment of the present disclosure.

Hereinafter, a vehicle control method according to various exemplary embodiments of the present disclosure will be described in detail with reference to FIG. 4. FIG. 4 illustrates a flowchart for describing a vehicle control method according to an exemplary embodiment of the present disclosure.

Hereinafter, it is assumed that the vehicle control apparatus 10 of the of FIG. 1 performs processes of FIG. 4. Furthermore, in a description of FIG. 4, operations referred to as being performed by the chassis controller 101, the main controller 201, and the external controller 301 may be understood as being controlled by a processor.

Referring to FIG. 4, the chassis controller 101 determines whether the main controller 201 and the sub controller 301 fail (S101). Furthermore, the subcontroller 301 may determine whether the main controller 201 fails.

The chassis controller 101 may determine the failure based on a failure state signal received from the main controller 201 and the subcontroller 301, or may determine the failure of the main controller 201 and the sub controller 301 by use of timeout through CAN communication, a CRC error, which is a standard for determining whether a CAN signal is normal, an alive counter to determine a failure when it is stuck for more than a predetermined time period. Furthermore, the subcontroller 301 may determine the failure based on a failure state signal received from the main controller 201, or may determine the failure of the main controller 201 by use of timeout through CAN communication, a CRC error, which is a standard for determining whether a CAN signal is normal, an alive counter to determine a failure when it is stuck for more than a certain time period.

The chassis controller 101 may determines whether the main controller 201 fails as a result of the failure determination in step S101 (S102), and when the main controller 201 does not fail, may receive a control command for the MRM from the main controller 201 to perform the MRM (S103).

Meanwhile, when the main controller 201 fails, the chassis controller 101 determines whether the main controller 201 and the sub controller 301 fail at the same time (S104).

Accordingly, when it is determined that the main controller 201 and the sub controller 301 fail at the same time, the chassis controller 101 changes the control subject for autonomous driving control from the main controller 201 to the chassis controller 101 (S105).

Accordingly, the chassis controller 101 may perform the MRM by itself regardless of the main controller 201 and the sub controller 301 (S106).

Meanwhile, when only the main controller 201 fails in step S104, the sub controller 301 changes the control subject for autonomous driving control from the main controller 201 to the subcontroller 301 (S107).

The sub controller 301 transmits a control subject change signal to the chassis controller 101 to notify that the control subject has been changed (S108).

Accordingly, the chassis controller 101 may receive a control command (e.g., a longitudinal control command, a lateral control command, deceleration, etc.) from the subcontroller 301 to perform the MRM (S109).

Accordingly, according to an exemplary embodiment of the present disclosure, it is possible to increase safety of the autonomous driving function by determining the failure of the main controller 201 by the sub controller 301 or the chassis controller 101 and changing a control subject for a failure response strategy from the main controller 201 to the chassis controller 101 or the sub controller 301.

Figure 5:
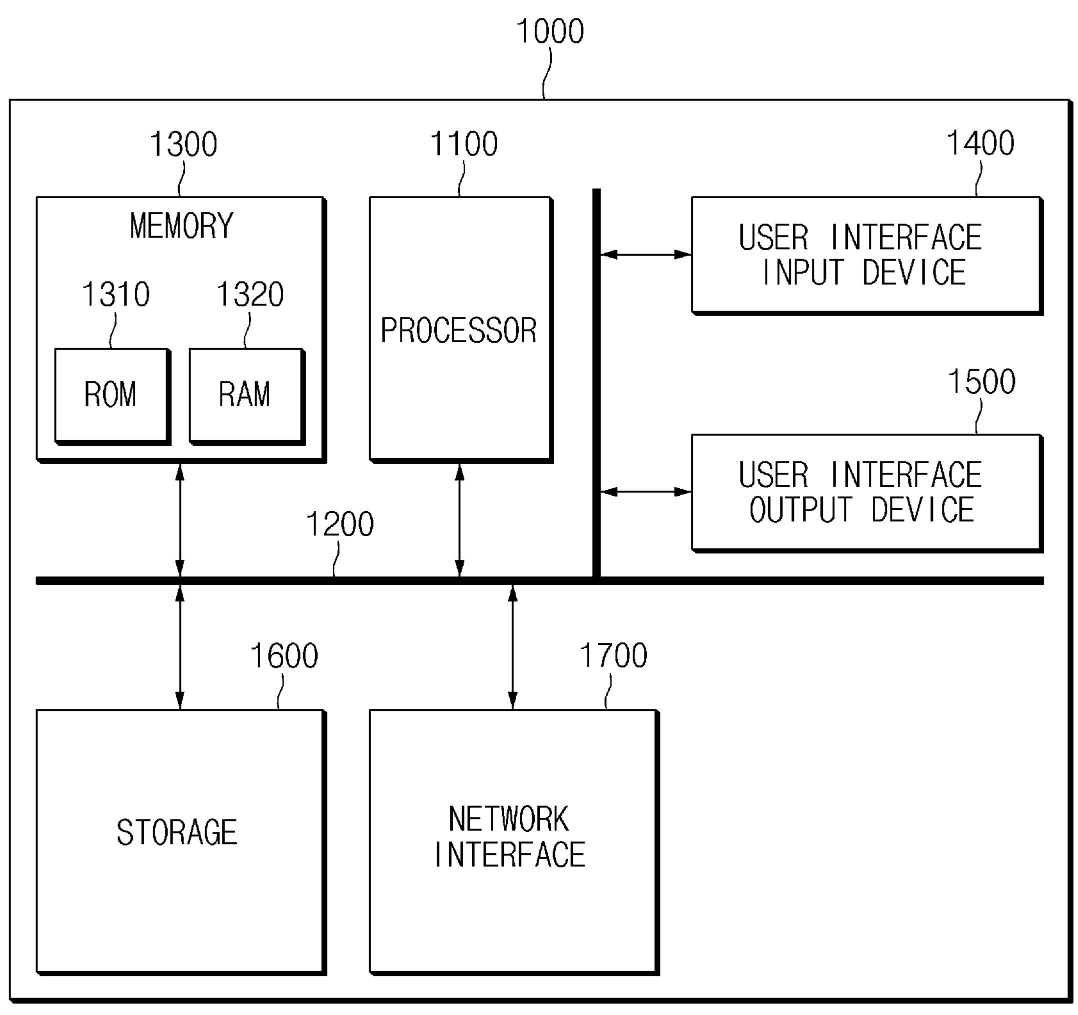
FIG. 5 illustrates a computing system according to an exemplary embodiment of the present disclosure.

FIG. 5 illustrates a computing system according to an exemplary embodiment of the present disclosure.

Referring to FIG. 5, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as “unit”, “module”, etc. included in the specification mean units for processing at least one function or operation, which may be implemented by hardware, software, or a combination thereof.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle control apparatus comprising:

a first controller configured to perform control for safety of a vehicle;

a second controller configured to mainly perform determination and control of autonomous driving of the vehicle; and a third controller configured to subordinately perform the determination and the control of the autonomous driving of the vehicle, wherein the third controller is configured to determine whether the second controller fails, when the second controller fails, to change a control subject for performing an autonomous driving function from the second controller to the third controller, and to transmit control subject change information to the first controller, wherein the third controller is further configured to have a risk level which is higher than or equal to a risk level of the second controller, wherein, when the second controller fails, the first controller is configured to:

receive a vehicle control command for fault response from the third controller based on the control subject being changed from the second controller to the third controller, and perform a failure response strategy response based on the control subject is changed from the second controller to the first controller by itself.

2. The vehicle control apparatus of claim 1, wherein the first controller is configured to receive the control subject change information from the third controller, and then to perform the failure response strategy based on the vehicle control command received from the third controller.

3. The vehicle control apparatus of claim 2, wherein the failure response strategy includes a transition demand requesting transfer of control authority from a system to a driver, a minimum risk maneuver (MRM), or at least one of any combination thereof.

4. The vehicle control apparatus of claim 1, wherein the first controller is configured to determine whether the second controller or the third controller fails during the autonomous driving, and to perform the autonomous driving function based on whether the second controller or the third controller fails instead of the second controller or the third controller.

5. The vehicle control apparatus of claim 4, wherein, when the second controller and the third controller fail, the first controller is configured to perform the failure response strategy by itself.

6. The vehicle control apparatus of claim 2, wherein the vehicle control command includes at least one of a longitudinal control command, a lateral control command, or any combination thereof.

7. The vehicle control apparatus of claim 1, wherein the second controller is configured to transmit failure state information to the first controller or the third controller by determining its own failure state.

8. The vehicle control apparatus of claim 1, wherein the third controller is further configured to transmit failure state information to the first controller by determining its own failure state.

9. The vehicle control apparatus of claim 1, wherein the first controller is configured to determine a failure state of the second controller or the third controller based on failure state information received from the second controller or the third controller, and wherein the third controller is further configured to determine a failure state of the second controller based on failure state information received from the second controller.

10. The vehicle control apparatus of claim 1, wherein the first controller is configured to determine a failure state of the second controller or the third controller by determining disconnection of communication with the second controller or the third controller based on wired network communication with the second controller or the third controller, and wherein the third controller is further configured to determine a failure state of the second controller by determining disconnection of communication with the second controller based on wired network communication with the second controller.

11. The vehicle control apparatus of claim 1, wherein the first controller is a chassis controller, the second controller is a main controller, and the third controller is a subcontroller.

12. The vehicle control apparatus of claim 1, wherein the second controller includes an electronic control unit (ECU), and the third controller includes a front camera.

13. A control method for a vehicle control apparatus including a first controller that performs control for safety of a vehicle, a second controller that mainly performs determination and control of autonomous driving of the vehicle, and a third controller that subordinately performs the determination and the control of the autonomous driving of the vehicle, the method comprising:

determining, by the third controller, whether the second controller fails;

changing a control subject for a failure response strategy from the second controller to the third controller when the second controller fails;

transmitting control subject change information related to the control subject being changed from the second controller to the third controller, to the first controller;

receiving, by the first controller, a vehicle control command for fault response from the third controller based on the control subject being changed from the second controller to the third controller when the second controller fails; and performing, by the first controller, a failure response strategy response based on the control subject being changed from the second controller to the first controller by itself when the second controller fails, wherein the third controller is configured to have a risk level which is higher than or equal to a risk level of the second controller.

14. The vehicle control method of claim 13, further including:

receiving, by the first controller, the control subject change information from the third controller, and then performing the failure response strategy based on the vehicle control command received from the third controller.

15. The vehicle control method of claim 13, wherein the failure response strategy includes a transition demand requesting transfer of control authority from a system to a driver, a minimum risk maneuver (MRM), or at least one of any combination thereof.

16. The vehicle control method of claim 14, further including:

determining, by the first controller, whether the second controller or the third controller fails during the autonomous driving; and performing, by the first controller, an autonomous driving function based on whether the second controller or the third controller fails instead of the second controller or the third controller.

17. The vehicle control method of claim 16, further including:

performing, by the first controller, the failure response strategy based on a command of the third controller when the second controller fails; and performing, by the first controller, the failure response strategy by itself when the second controller and the third controller fail.

18. The vehicle control method of claim 13, further including:

determining, by the second controller, its own failure state and transmitting failure state information to the first controller or the third controller;

determining, by the first controller, a failure state of the second controller or the third controller based on failure state information received from the second controller or the third controller; and determining, by the third controller, a failure state of the second controller based on failure state information received from the second controller.

* * * * *